(12) United States Patent
Donovan et al.

(10) Patent No.: US 6,519,468 B1
(45) Date of Patent: *Feb. 11, 2003

(54) PCS WITH ENHANCED SHORT-MESSAGE SERVICE OPTION

(75) Inventors: Steven R. Donovan; John K. Gallant; Shou S. Gung, all of Plano; Anthony K. Wong, Dallas, all of TX (US)

(73) Assignee: WorldCom, Inc., Clinton, MS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,234

(22) Filed: Dec. 11, 1998

Related U.S. Application Data

(62) Division of application No. 08/670,678, filed on Jun. 26, 1996, now Pat. No. 5,903,726.

(51) Int. Cl.⁷ .................................................. H04Q 7/20
(52) U.S. Cl. ........................ 455/466; 455/413; 455/566
(58) Field of Search ......................... 455/466, 45, 38.1, 455/38.2, 38.3, 38.4, 412, 550, 566, 567, 414, 413, 433, 552; 340/825.44, 311.1, 7.46, 7.47, 7.48

(56) References Cited

U.S. PATENT DOCUMENTS

| | | | |
|---|---|---|---|
| 5,351,235 A | | 9/1994 | Lahtinen |
| 5,398,021 A | * | 3/1995 | Moore .................... 340/825.44 |
| 5,428,665 A | | 6/1995 | Lantto |
| 5,506,887 A | | 4/1996 | Emery et al. |
| 5,506,888 A | | 4/1996 | Hayes et al. |
| 5,535,428 A | * | 7/1996 | King et al. ................. 455/38.4 |
| 5,550,535 A | * | 8/1996 | Park ....................... 340/825.44 |
| 5,590,175 A | | 12/1996 | Gallant et al. |
| 5,604,921 A | * | 2/1997 | Alanara ....................... 455/45 |
| 5,666,348 A | | 9/1997 | Thornberg et al. |
| 5,678,179 A | * | 10/1997 | Turcotte et al. ............. 455/466 |
| 5,842,141 A | * | 11/1998 | Vaihoja et al. .............. 455/466 |
| 5,903,726 A | * | 5/1999 | Donovan et al. ........... 709/206 |
| 6,014,561 A | * | 1/2000 | Molne ........................ 455/552 |
| 6,032,053 A | * | 2/2000 | Schroeder et al. .......... 455/566 |
| 6,085,068 A | * | 7/2000 | Eaton et al. ............... 455/38.3 |
| 6,085,099 A | | 7/2000 | Ritter et al. |
| 6,101,393 A | * | 8/2000 | Alperovich et al. ........ 455/466 |

FOREIGN PATENT DOCUMENTS

| | | |
|---|---|---|
| DE | 43 40 679 | 6/1995 |
| EP | 689 368 A1 | 6/1994 |
| WO | 92 17943 | 10/1992 |
| WO | 95/12933 | 11/1995 |
| WO | 97 32439 | 9/1997 |

OTHER PUBLICATIONS

Martini et al., "Distributed Architecture for Applications based on the GSM short Message Service", Apr. 1995, pp. 140–145, IEEE.

Holley, "The GSM Short Message Service", 1991, pp. 7/1–7/5, IEEE.

* cited by examiner

Primary Examiner—Lester G. Kincaid

(57) ABSTRACT

A subscriber terminal for use in a communications system with enhanced short message service options is configured for receiving an unbundled short message that includes a short message type field and a short message data field. If the subscriber terminal supports the short message type, then the short message data is processed; otherwise, the short message is discarded.

8 Claims, 7 Drawing Sheets

PCS WITH ENHANCED SHORT-MESSAGE SERVICE OPTION

CROSS-REFERENCED TO RELATED APPLICATIONS

This patent application is a Divisional of U.S. patent application Ser. No. 08/670,678 filed on Jun. 26, 1996 now U.S. Pat. No. 5,903,726.

BACKGROUND OF THE INVENTION

1. Field of the Invention

The present invention relates generally to personal communications systems, and more specifically is directed toward the delivery of short-message services.

2. Related Art

A personal communications services (PCS) system is a mobile service platform that seeks to revolutionize communications by allowing users to call people rather than customer premise equipment. In other words, a PCS subscriber is reachable at a single number regardless of the PCS subscriber's location within the PCS network. Achieving this flexibility requires an intelligent network that can recognize a location of a subscriber and subsequently route a particular communication service to that location.

A PCS system is generally defined independent of a particular communication service. The communications services supported by PCS include paging, residential cordless telephony, data broadcasting, cellular telephony, mobile data, etc. Customers can subscribe to one or more of these services based upon their individual preferences. These individual preferences should also be recognized by the intelligent network.

The key to success of PCS is the ability to offer a variety of services with different characteristics and different tariff structures. One example is the short-message service. Short-message service is a feature that provides for delivery of up to 160 characters to and from a mobile subscriber. This messaging feature can provide a powerful complement to the high-quality voice mobile service. Numerous applications of the short-message service can be envisioned. Accordingly, what is needed is a short-message service that can be selectively enabled based upon a subscriber's choice of one of a plurality of unbundled short-message service applications.

SUMMARY OF THE INVENTION

In accordance with one aspect, the present invention is directed to a subscriber terminal comprising means for receiving a short message, the short message including a short message type field and a short message data field, means for identifying a short message type based on the short message type field, means for providing short message data contained in said short message data field to logic associated with the short message type, and logic means for providing the short message data according to a procedure for the short message type.

The present invention satisfies the above mentioned needs by providing a personal communication services system that recognizes specific applications within the short-message service option. Each of these unbundled short-message services (e.g., emergency messages, customer service messages, voice mail alert messages, teleadmin service, etc.) are recognized and processed based upon an unbundled short-message service type.

Processing of a short message begins with the reception by a short-message (SM) system of a communication from a short-message entity. This communication includes a short message, a destination subscriber number and an unbundled short-message service type. The short message is stored by the short-message system pending the availability of the destination subscriber.

Prior to determining the availability of the destination subscriber, the short-message system first determines whether the destination subscriber is eligible to receive the short message. In this process, the short-message system interacts with a Home Location Register (HLR) that stores the customer profile for the destination subscriber. In one embodiment, the HLR determines whether the destination subscriber is eligible to receive the general class of short messages and/or the unbundled short-message service type based upon a lookup in the customer profile record.

If the destination subscriber is allowed to receive the unbundled short-message service associated with the unbundled short-message service type, the HLR may perform further processing for the short-message service. For example, in a voice mail alert service, the HLR may identify a pager number if the destination subscriber is unavailable.

If the destination subscriber is available, the short-message system sends a query to the HLR to determine the location of the destination subscriber. The location of the destination subscriber may be identified through addresses for a mobile services center (MSC)/visitor location register (VLR). After these addresses are obtained, the short-message system sends the short message to the MSC/VLR. In a preferred embodiment, the Mobile Application Part protocol is used. Upon receipt, the MSC/VLR forwards the short message to the destination subscriber via a base station.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Short-message service is one of many services that are supported by personal communications service (PCS) systems. Short-message service provides for the delivery of N characters (e.g., 160, 200, etc.) both to and from a subscriber terminal (ST) in a connectionless manner. Unlike standard telephone calls, no land-line speech path setup is required. The short-message service may be delivered to single subscribers or to a plurality of subscribers in a broadcast fashion.

The N characters within a short message may be used in a variety of applications. The simplest application is the provision of alphanumeric messages as a supplement to the standard mobile voice service. These alphanumeric messages, which includes emergency messages, customer service messages, etc. may be displayed on a subscriber terminal. In other applications such as voice mail alert, the short message may be used to activate an icon on the display of a subscriber terminal. Still further, short messages may also be used in functional applications such as a teleadmin service, which provides an over the air activation (OTAA) function designed to remotely reconfigure a subscriber terminal.

Figure 1:
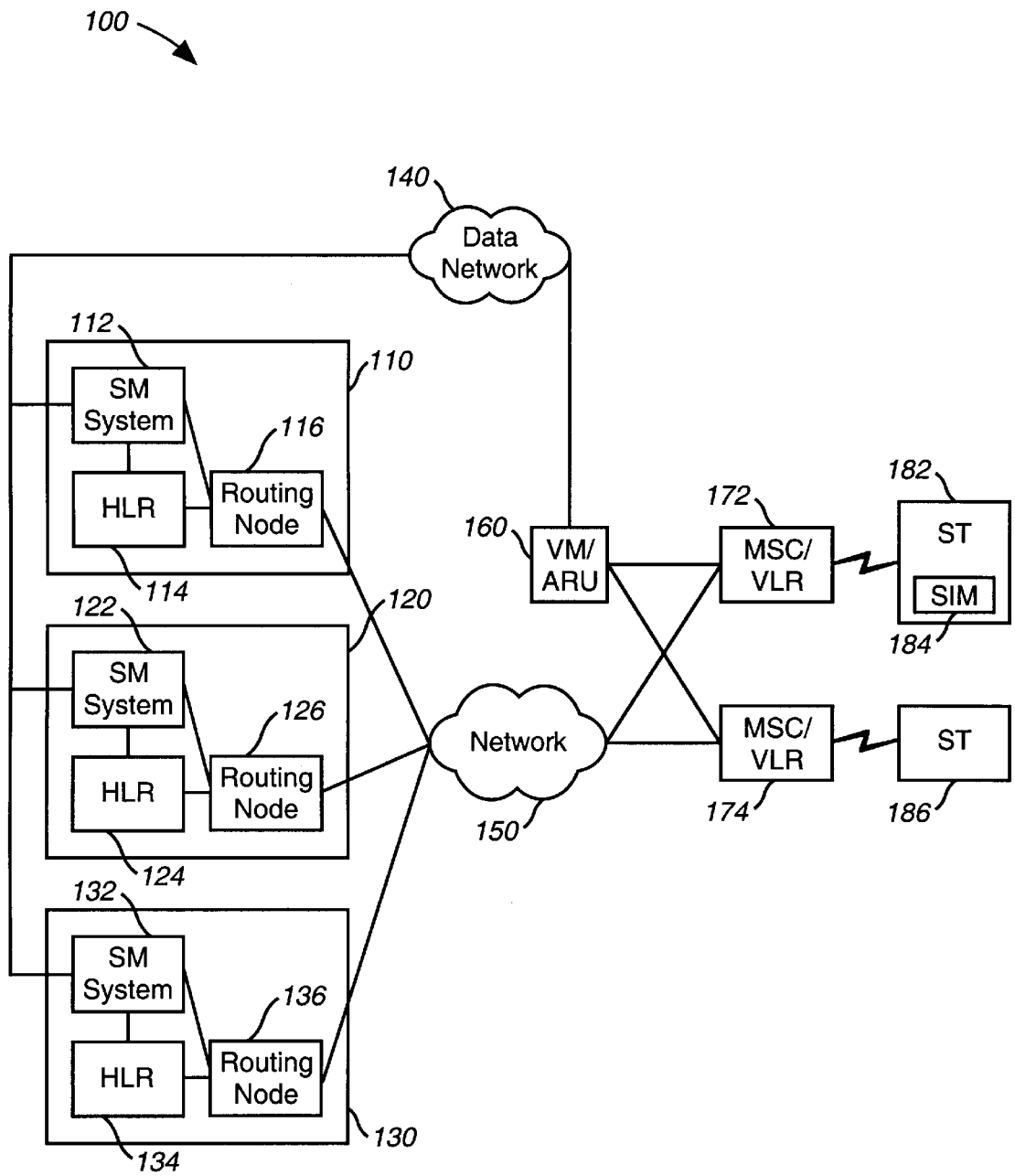
FIG. 1 illustrates a short-message service delivery system according to the present invention.

In one exemplary embodiment, a subscriber terminal 182, as illustrated in FIG. 1, includes a subscriber identity module (SIM) 184. The SIM 184 includes information (e.g., authentication information, subscriber profile information, etc.) about a subscriber that is used to control how subscriber terminal 182 operates with the PCS network. A teleadmin short message can therefore be used to remotely reconfigure the SIM 184 within subscriber terminal 182. Note that in other embodiments, a subscriber terminal 186 does not include a removable SIM module.

As these examples illustrate, the N characters within a short message may be used in a variety of applications. These applications may be display based, icon based, or functionally operative at the subscriber terminal. Note that these examples are provided without limitation. Other examples that use a generic binary message are also contemplated.

As a further means of customization, the present invention allows a subscriber to choose between the set of short-message services that are offered. Differentiation between these various applications is consistent with the general PCS philosophy of offering a variety of services with varying tariffs.

Currently, PCS systems such as the European-defined global system for mobile communication (GSM) or the US-defined interim standard (IS-41) provision the short-message service as a single service group of mobile originated and terminated point-to-point short messages. The present invention expands upon the basic short-message service functionality by unbundling the short-message services into a variety of recognizably distinct short-message applications. Through this unbundling, the PCS system components may implement enhanced short-message service applications through the execution of predefined functions. The predefined functions are individually dedicated to unbundled short-message service types.

FIG. 1 illustrates a high-level overview of a PCS system 100 capable of transporting short messages to subscriber terminals 182, 186. In one exemplary embodiment, PCS system comprises three wireless intelligent network sites 110, 120, 130. These three national sites 110, 120, 130 provide a high level of system reliability through system and geographic diversity. This diversity mitigates the effects of network outages, natural disasters or sabotage. In this exemplary embodiment, the three national sites 110, 120, 130 may be situated in the western, central and eastern regions, respectively. Note that alternate embodiments could use more or less national sites without departing from the spirit of the present invention.

Each site 110, 120, 130 comprises a short message (SM) system 112, 122, 132, a Home Location Register (HLR) 114, 124, 134 and a routing node 116, 126, 136, respectively. Routing nodes 116, 126, 136 connect short message systems 112, 122, 132 and HLRs 114, 124, 134 to mobile switching centers/visitor location registers (MSC/VLRs) 172, 174 via network 150 (e.g., a wide area network). The MSC/VLRs 172, 174 are linked to individual subscriber terminals 182, 186 via base stations (not shown). In an alternate embodiment, the system components within sites 110, 120, 130 could be distributed throughout the network. For example, an HLR could be colocated with a VLR. In further alternate embodiments, network 150 is a common channel signaling (CSC) network and routing nodes 116, 126, 136 are signal transfer points (STPs).

The MSCs are switching centers that incorporate all the switching functions needed for routing services (e.g., voice, data, short messages, etc.) to subscriber terminals 182, 186 located in an associated geographical area. The MSCs communicate with subscriber terminals 182, 186 via radio systems that are embodied in a plurality of base stations (not shown). To obtain proper radio coverage for a given geographical area, each MSC is connected to a plurality of base stations.

The MSCs are further connected to lines and trunks of the fixed networks such as the interexchange carriers (IXCs) and the local exchange carriers (LECs). These connections allow the PCS system to provide voice and data services to subscribers. Call setup information for these voice and data services are provided through a common channel signaling (CCS) network (e.g., signaling system #7). The CCS network generally comprises mated STP pairs that are interconnected in a mesh architecture via a plurality of links.

With respect to short-message services, data to be transmitted to subscribers originate at short-message entities (SMEs). As illustrated in FIG. 1, one example of an SME is voice mail/automated response unit (VM/ARU) 160. In a voice mail alert short-message application, VM/ARU 160 sends a voice mail alert message to one of the three short message systems 112, 122, 132 via a data communications network 140 (e.g., X.25, TCP/IP). In other short-message applications, SMEs may send short messages to short-message systems 112, 122, 132 via network 150 using a predefined protocol.

Short messages that are stored in short-message systems 112, 122, 132 are transmitted to the appropriate MSC/VLR 172, 174 via network 150. Connection of sites 110, 120, 130 to network 150 is provided through routing nodes 116, 126, 136, respectively. In an embodiment where network 150 is a CCS network, the short-message data is transmitted to the appropriate MSC/VLR 172, 174, using the Mobile Application Part (MAP) protocol.

In identifying the appropriate destination MSC/VLR 172, 174, short-message systems 112, 122, 132 rely upon customer profile information that is stored in HLRs 114, 124, 134. Generally, HLRs 114, 124, 134 are per-subscriber databases. In other words, a logical record is stored for each subscriber. Each logical record is indexed by primary keys such as the international mobile station identity (IMSI) and the mobile station international ISDN number (MsISDN). The logical records in HLRs 114, 124, 134 store management data for a plurality of subscribers. This management data includes both subscription information and location information. Subscription information includes a listing of the basic and supplementary services that a subscriber has selected. As will be described in greater detail below, the subscription information is relied upon by MSC/VLR 172, 174 to determine whether a service can be provided to a particular subscriber.

Location information, on the other hand, includes an MSC/VLR address for a subscriber. This MSC/VLR address enables short-message system 112, 122, 132 to route a short message to the MSC/VLR 172, 174 that operates in the area that the destination subscriber is located. In a preferred embodiment, each short-message system 112, 122, 132 can communicate with any one of HLRs 114, 124, 134. For simplicity, FIG. 1 illustrates connections only between HLRs and short-message systems that are located at the same site 110, 120, 130.

The VLRs are the functional units that dynamically store subscriber information, when the subscriber is located in the VLRs area. When a roaming subscriber enters an area controlled by an MSC, the MSC notifies the associated VLR. The VLR then initiates a registration procedure wherein the roaming subscriber is assigned a mobile subscriber roaming number (MSRN) or visited network address. This assigned number is used to route services to the roaming subscriber.

The VLR stores this assigned number in a database record that is keyed on the same IMSI and MSISDN numbers as the database records in the HLR 114, 124, 134. The database records also include call handling data that is retrieved from HLR 114, 124, 134 at which the roaming subscriber was registered. This call handling data can identify the provision of supplementary services such as call forwarding, barring all incoming/outgoing calls, call hold, etc.

Figure 2:
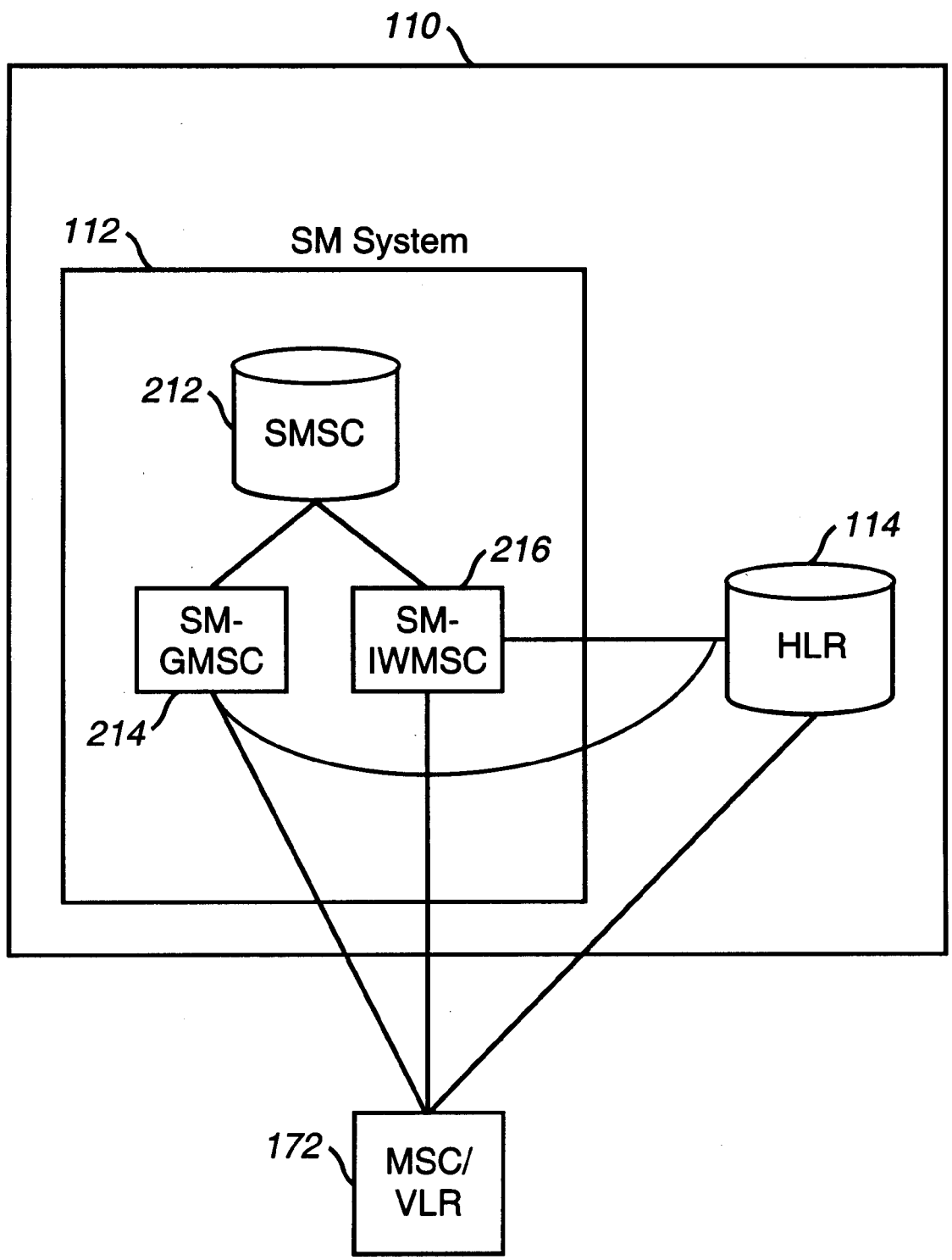
FIG. 2 illustrates the logical functionality within the short-message service delivery system.

Having provided an overview of the system components within PCS system 100, the handling of a short-message service is now described with reference to the block diagram of FIG. 2 and the flow chart of FIG. 3. FIG. 2 illustrates a more detailed logical function view of short-message system 112. The short-message system 112 comprises short-message service center (SMSC) 212, short-message gateway MSC (SM-GMSC) 214 and short-message interworking MSC (SM-IWMSC) 216.

The SMSC 212 is a store-and-forward database that stores the short messages received from an SME. The short messages that are stored in SMSC 212 may be accessed using the MSISDN. If the destination subscriber is unavailable, the short messages will accumulate in SMSC 212.

The SM-GMSC 214 is an interface between SMSC 212 and MSC/VLRs 172, 174. This interface supports the delivery of short messages from SMSC 212 to the destination subscriber. The SM-GMSC 214 is responsible for determining the location of the destination subscriber and sending the short message to the appropriate MSC/VLR 172, 174 via network 150.

The SM-IWMSC 216 is a second interface between SMSC 212 and MSC/VLRs 172, 174. This second interface supports the delivery of short messages from a subscriber to SMSC 212. In one example, a short message from the subscriber alerts short-message system 112 that the subscriber is now available to receive a message that was unsuccessfully delivered.

Figure 3:
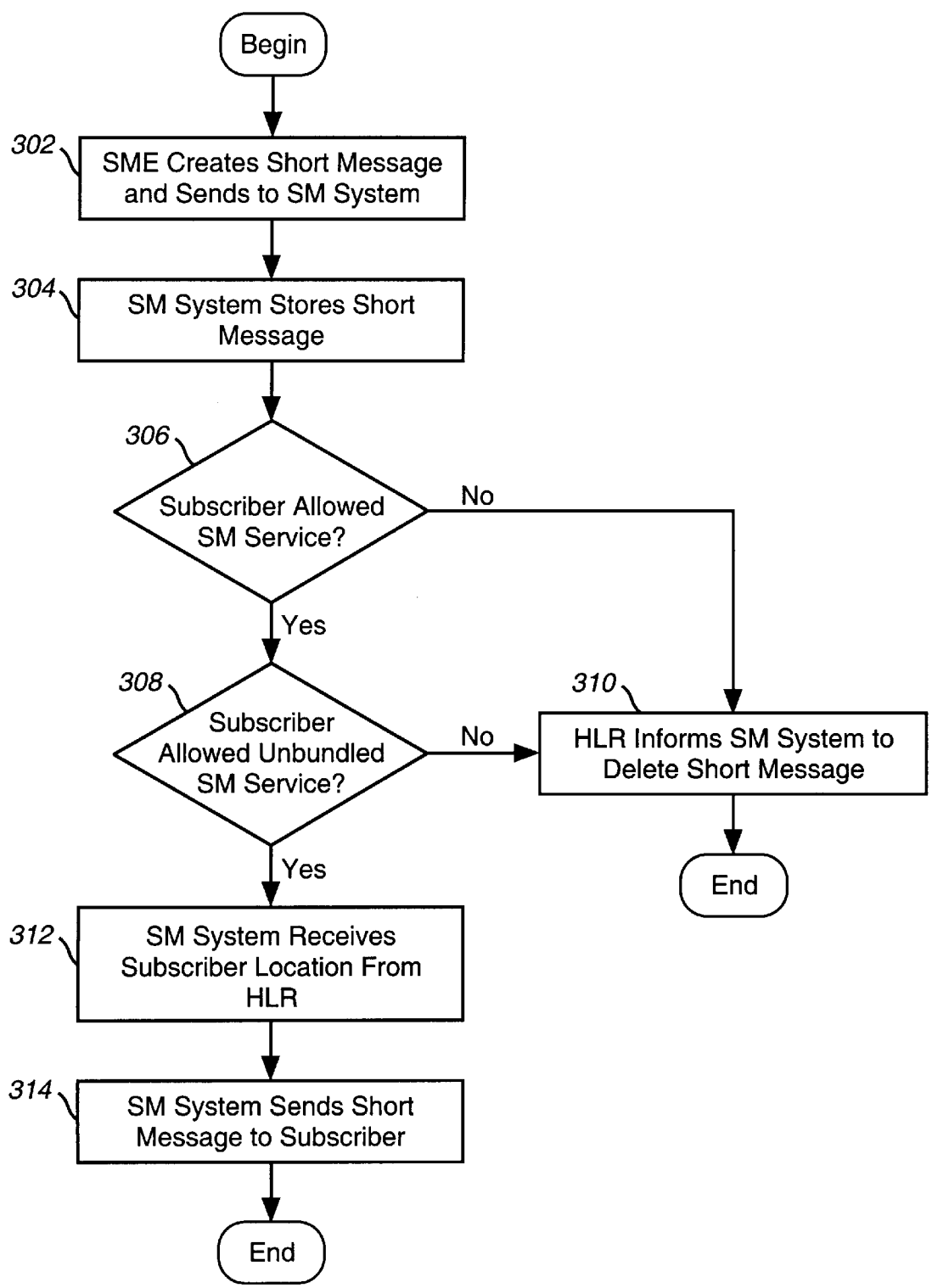
FIGS. 3 and 4 illustrate flow charts of the short-message service processing of a service provider.

FIG. 3 illustrates a flow chart describing a generic short-message delivery process. This process begins at step 302 where an SME creates a short message and sends it to one of short-message system 112, 122, 132. In the following example, the interaction between short-message system 212 and HLR 214 is described. As noted above, however, each short-message system 112, 122, 132 may interact with each HLR 114, 124, 134.

Generally, a short-message communication from an SME comprises the short message, a destination number of the destination subscriber, and a short-message type. The short-message type identifies one of the specific unbundled short-message services such as emergency messages, customer service messages, voice mail alert messages, teleadmin, etc.

Next, at step 304, short-message system 112 stores the short message in SMSC 212. In one exemplary embodiment, short-message system 112 stores the short message in SMSC 212 according to the MSISDN. Clearly, any identifier that uniquely identifies the destination subscriber may be used.

At this point, short-message system 112 determines whether it can deliver the short message to the destination subscriber. In making this determination short-message system 112 identifies the services that the destination subscriber is allowed to receive. In the present invention, the general category of short messages has been unbundled into a variety of specialized short-message services. Each of these unbundled short-message services is assigned a distinct service group number that is recognized in the customer profile stored in HLR 114. As noted above, these distinct service group numbers are consistent with the overall philosophy of PCS by allowing subscribers to select individually tariffed services.

With this unbundling, two service inquiries may be made by short-message system 112 to HLR 114. These service inquiries may be issued simultaneously or sequentially. First, as illustrated at step 306 of FIG. 3, short-message system 112 identifies whether the destination subscriber is allowed to receive any short-message services. If it is determined at step 306 that the destination subscriber is not allowed to receive the general class of short-message services, HLR 114 informs short-message system 112 at step 310 to delete the short message from SMSC 212. Conversely, if HLR 114 confirms that the destination subscriber is allowed to receive the general class of short-message service, short-message system 112 proceeds to the second service inquiry. In this second service inquiry, short-message system 112 identifies at step 308 whether the destination subscriber is allowed to receive the specific unbundled short-message service. If it is determined that the destination subscriber is not allowed to receive the specific unbundled short-message service, HLR 114 informs short-message system 112 at step 310 to delete the short message from SMSC 212.

If HLR 114 confirms that the destination subscriber is allowed to receive the specific unbundled short-message service, short-message system 112 proceeds to step 312. At step 312, short-message system 112 queries HLR 114 to determine the location of the destination subscriber. This location may be identified by HLR 114 by an MSC/VLR address that is stored in the customer profile. After the location information is obtained, short-message system 112 sends the short message to the destination subscriber at step 314.

Figure 4:
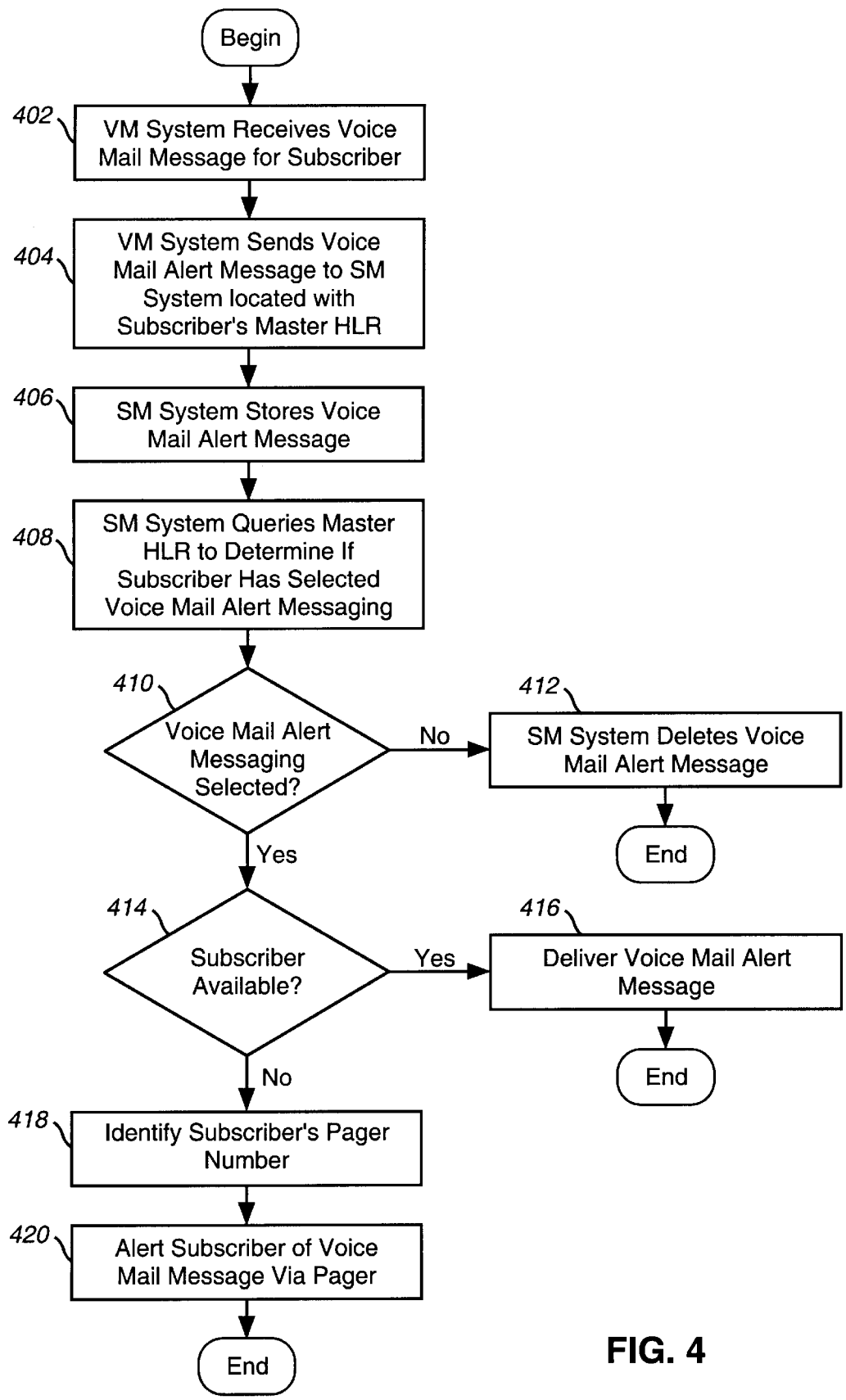

As this generic short-message delivery process illustrates, HLR 114 identifies the eligibility of the destination subscriber to receive a specific unbundled short-message service. Based upon this determination, HLR 114 may also perform further processing in accordance with procedures that have been predefined for that unbundled short-message service. The voice mail alert example of FIG. 4 illustrates this concept.

The voice mail alert process begins at step 402 where a VM/ARU 160 receives a voice mail message for a destination subscriber. Next, at step 404, VM/ARU 160 sends a voice mail alert message to a short-message system 112, 122, 132 that is located with the subscriber's master HLR 114, 124, 134. Again, in this example, the interaction between short-message system 112 and HLR 114 is described. This communication occurs over data communications network 140. Upon receipt, HLR 114 stores the voice mail alert message in SMSC 212 at step 406.

Short-message system 112 then sends at step 408 a query to HLR 114 to determine if the destination subscriber is allowed to receive voice mail alert message service. If, at step 408, it is determined that the destination subscriber is not allowed to receive voice mail alert message service, short-message system 112 deletes the voice mail alert message from SMSC 212, as shown in step 412. If the destination subscriber is allowed to receive voice mail alert message service, the process continues in step 414. At step 414, short-message system 112 sends a query to HLR 114 to determine if the destination subscriber is available. If the destination subscriber is available, short-message system 112 receives the MSC/VLR address for the destination subscriber and sends the voice mail alert message to the destination subscriber at step 416. If the destination subscriber is unavailable, HLR 114 can proceed with additional processing. In one exemplary embodiment, HLR 114 can identify an alternate method of communicating with the subscriber associated with the destination subscriber. In the example of FIG. 4, HLR 114 at step 418 identifies the pager number for the subscriber associated with the destination subscriber. Thereafter, at step 420, the subscriber is alerted of the voice mail message via the pager.

As this voice mail alert example illustrates, customized processing may be associated with each unbundled short-message service. In accordance with this customized processing, the tariff for each of the unbundled short-message services may also vary. Variable tariffs may be implemented by distinguishing the unbundled short-message services in the call detail records that are sent to the billing system (not shown).

Figure 5:
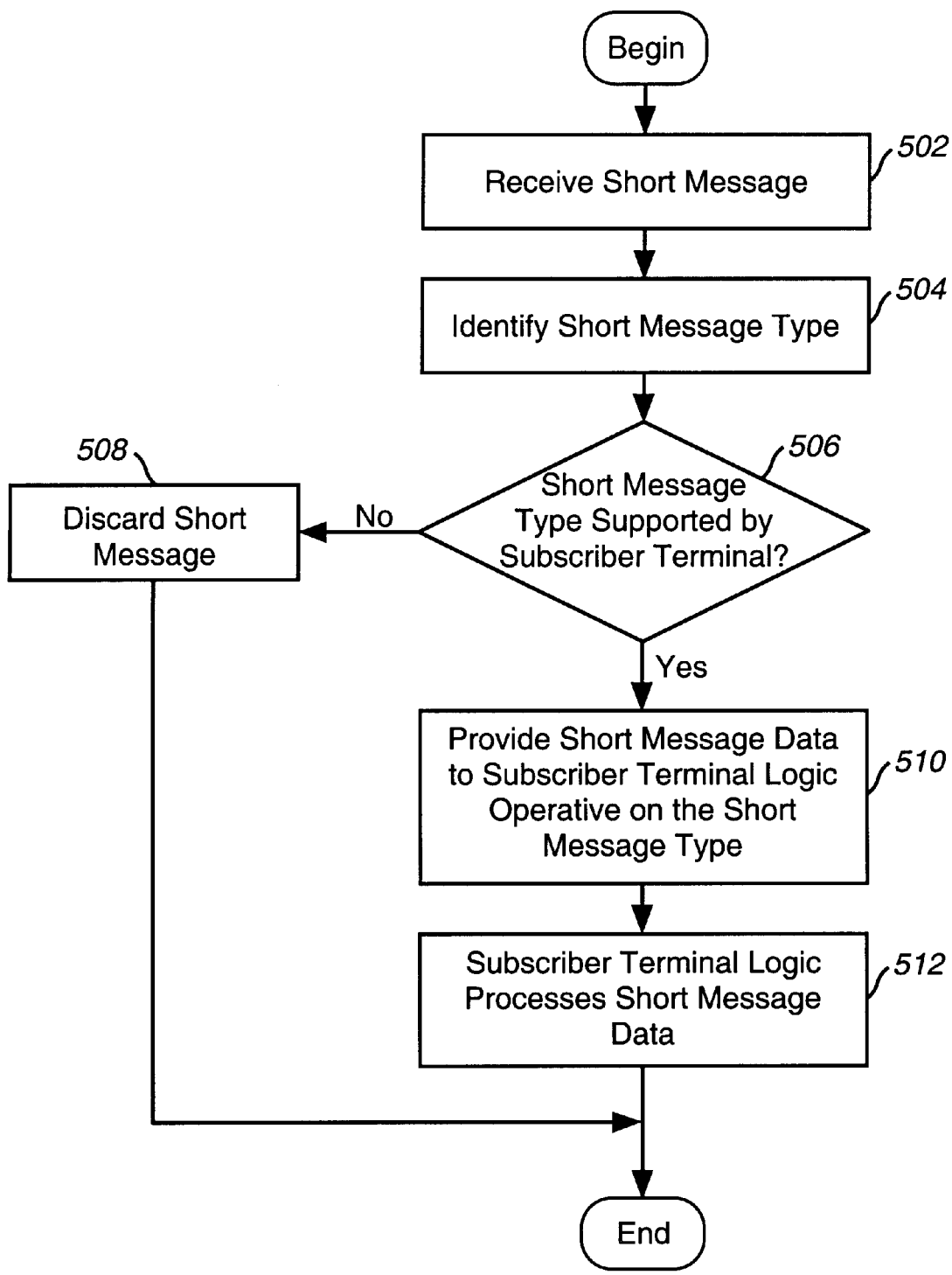
FIG. 5 illustrates a flow chart of the short-message service processing of a subscriber terminal.
Figure 7:
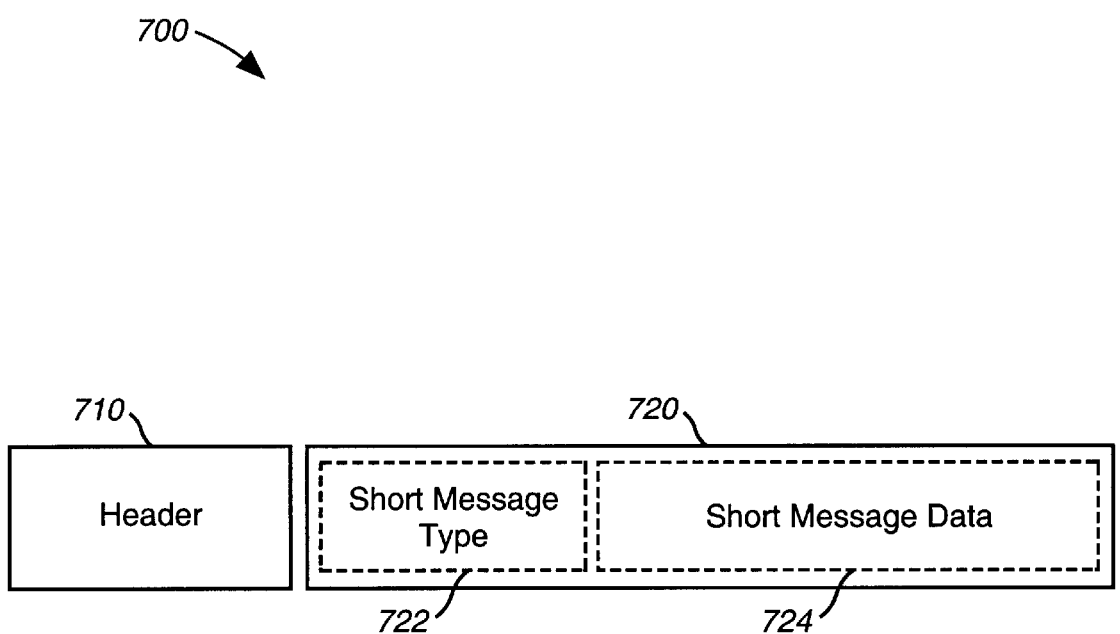
FIG. 7 illustrates the format of an exemplary short message.

Having discussed the processing of unbundled short-message services within a PCS service provider's network, the corresponding processing at a subscriber terminal is now described. FIG. 5 illustrates a flow chart of the processing within subscriber terminal 182, 186. This process begins at step 502 where subscriber terminal 182, 186 receives a short message from an MSC. FIG. 7 illustrates an example of the format of a short message. Short message 700 includes a header 710 and a short message payload 720. Short message payload 720 further comprises a message type field 722 and a message data field 724. In GSM format, short message payload 720 is 160 octets in length. In this context, short message type field 722 may be assigned one octet and short message data field 724 may be assigned 159 octets. Note that short message data field 724 can be formatted in any application specific manner.

Returning to FIG. 5, subscriber terminal 182, 186 then identifies at step 504 the short message type from short message type field 722. As described above, possible short message types include emergency messages, customer service messages, voice mail alert messages, teleadmin service, etc. Each of the unbundled short message service types is assigned a distinct short message service type code that is included within message type field 722.

After the short message type is identified at step 504, subscriber terminal 182, 186 then determines at step 506 whether the short message type is supported by the subscriber terminal. If the short message type is not supported by the subscriber terminal, the short message is discarded at step 508 and the process ends.

If subscriber terminal 182, 186 determines at step 506 that the short message type is supported by the subscriber terminal, then the process continues to step 510. At step 510, subscriber terminal 182, 186 provides the short message data included in short message data field 724 to the logic that is operative on the identified short message type. In one exemplary embodiment, subscriber terminal 182, 186 includes logic for a subset of the available short message services selected by the subscriber. In other embodiments, subscriber terminal 182, 186 includes logic for the entire set of available short message services. In this case, only the logic for the subscriber selected short message services may be activated.

As noted above, short message data field 724 may be formatted in an application specific manner. For example, short message data field 724 may include ASCII encoded alphanumeric characters or generic binary data to be input into application specific logic.

Finally, at step 512, subscriber terminal 182, 186 processes the short message data according to the procedures defined by the logic that is associated with the particular short message service type. For example, in an emergency message application, ASCII encoded short message data could be output to the display screen of subscriber terminal 182, 186. In a voice mail alert example, the short message data could prompt the logic assigned to that service type to cause a voice mail icon to be displayed on subscriber terminal 182, 186. Still further, in a teleadmin service, the short message data could cause subscriber terminal 182, 186 to reconfigure itself. Acknowledgment of the reconfiguration could then be returned to the MSC. In this acknowledgment process, subscriber terminal 182, 186 includes a transaction ID included within header 710 in the acknowledgment message.

Figure 6:
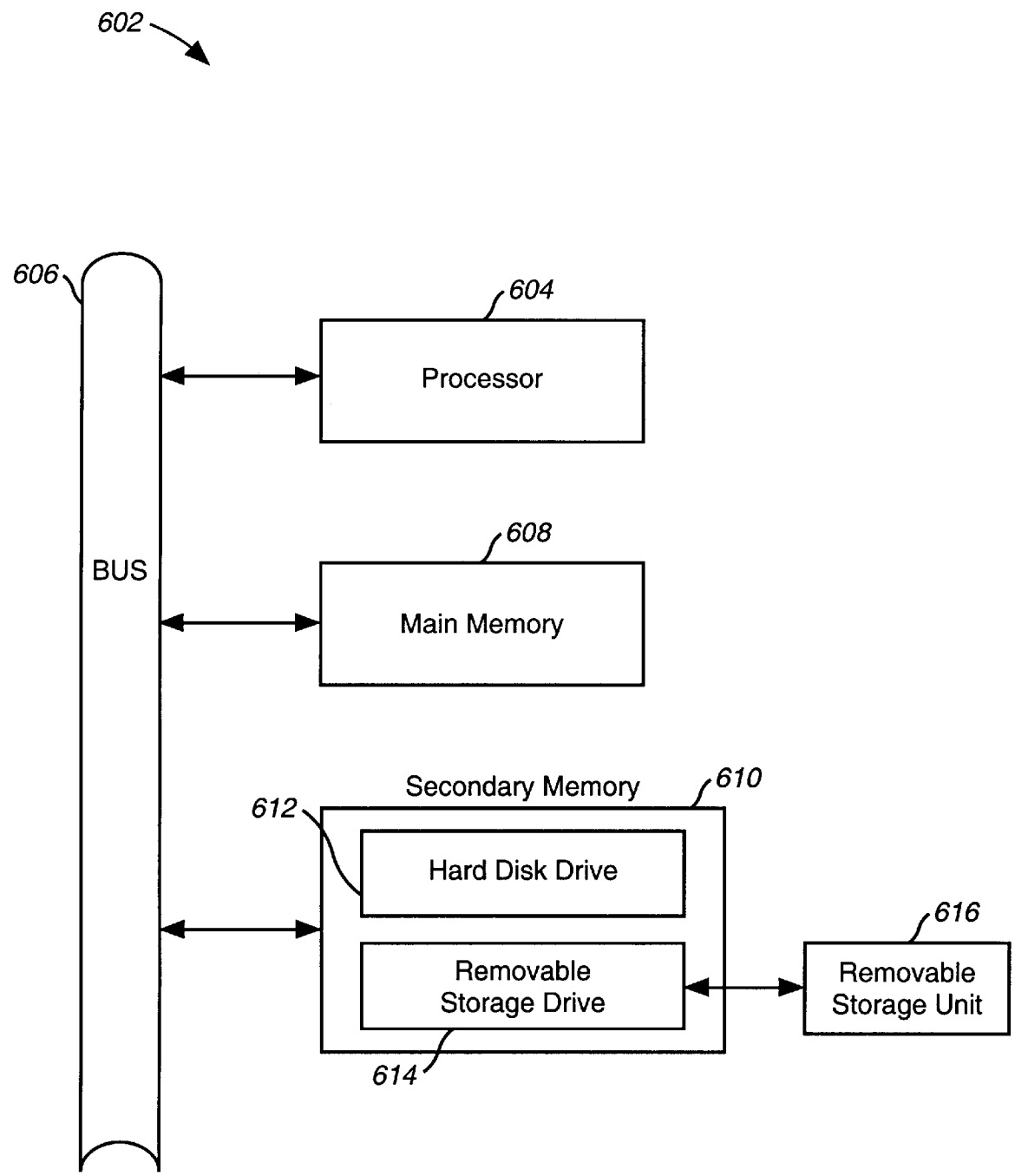
FIG. 6 illustrates a block diagram of a computer useful for implementing elements of the present invention.

In one exemplary embodiment, the present invention is directed to a computer system operating as discussed herein. An exemplary computer system 602 is shown in FIG. 6. The computer system 602 includes one or more processors, such as processor 604. The processor 604 is connected to a communication bus 606.

The computer system 602 also includes a main memory 608, preferably random access memory (RAM), and a secondary memory 610. The secondary memory 610 includes, for example, a hard disk drive 612 and/or a removable storage drive 614, representing a floppy disk drive, a magnetic tape drive, a compact disk drive, etc. The removable storage drive 614 reads from and/or writes to a removable storage unit 616 in a well known manner.

Removable storage unit 616, also called a program storage device or a computer program product, represents a floppy disk, magnetic tape, compact disk, etc. As will be appreciated, the removable storage unit 616 includes a computer usable storage medium having stored therein computer software and/or data.

Computer programs (also called computer control logic) are stored in main memory and/or the secondary memory 610. Such computer programs, when executed, enable the computer system 602 to perform the features of the present invention as discussed herein. In particular, the computer programs, when executed, enable the processor 604 to perform the features of the present invention. Accordingly, such computer programs represent controllers of the computer system 602.

In another exemplary embodiment, the present invention is directed to a computer program product comprising a computer readable medium having control logic (computer software) stored therein. The control logic, when executed by the processor 604, causes the processor 604 to perform the functions of the invention as described herein.

In another exemplary embodiment, the present invention is implemented primarily in hardware using, for example, a hardware state machine. Implementation of the hardware state machine so as to perform the functions described herein will be apparent to persons skilled in the relevant art(s).

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A subscriber terminal, comprising:
    means for receiving an unbundled short message, said short message including a short message type field and a short message data field;
    means for identifying a short message type based on said short message type field;
    means for determining whether a short message is supported by the subscriber terminal;
    means for discarding the short message if the short message type is not supported by the subscriber terminal; and
    logic means for processing said short message data according to a procedure for said short message type if the short message type is supported by the subscriber terminal.

2. The subscriber terminal of claim 1, wherein said logic means outputs said short message data to a display screen on the subscriber terminal.

3. The subscriber terminal of claim 1, wherein said logic means activates an icon on a display screen of the subscriber terminal.

4. The subscriber terminal of claim 1, wherein said logic means sends an acknowledgement message to a mobile switching center upon completion of processing of said short message data.

5. A method of providing short message services at a subscriber terminal, the method comprising the steps of:
    receiving an unbundled short message at the subscriber terminal, said short message including a short message type field and a short message data field;
    identifying a short message type based on said short message type field;
    determining whether the short message is supported by the subscriber terminal;
    if the short message type is not supported by the subscriber terminal, then discarding the short message; and
    if the short message type is supported by the subscriber terminal, then processing said short message data according to a procedure for said short message type.

6. The method of claim 5 further comprising the step of outputting said short message data to a display screen on said subscriber terminal.

7. The method of claim 5 further comprising the step of activating an icon on a display screen of said subscriber terminal.

8. The method of claim 5 further comprising the step of sending an acknowledgement message to a mobile switching center upon completion of processing of said short message data.

* * * * *